United States Patent [19]

Tsuge et al.

[11] Patent Number: 4,991,874
[45] Date of Patent: Feb. 12, 1991

[54] WEBBING RETRACTOR

[75] Inventors: Hiroshi Tsuge; Shinji Mori, both of Aichi, Japan

[73] Assignee: Kabushiki Kaisha Tokai-Rika-Denki-Seisakusho, Aichi, Japan

[21] Appl. No.: 500,561

[22] Filed: Mar. 28, 1990

[30] Foreign Application Priority Data

Mar. 31, 1989 [JP] Japan .................. 1-38895[U]

[51] Int. Cl.$^5$ .............. B60R 22/32; B60R 22/36
[52] U.S. Cl. ................. 280/806; 280/802; 242/107.4 A
[58] Field of Search .......... 280/802, 803, 804, 806, 280/807; 242/107.4 A, 107.4 B, 86.5 R; 297/475, 476, 477, 478

[56] References Cited

U.S. PATENT DOCUMENTS

| 4,603,819 | 8/1986 | Loose et al. | 280/806 |
|---|---|---|---|
| 4,688,825 | 8/1987 | Arbogast et al. | 280/806 |
| 4,714,274 | 12/1987 | Nagashima | 280/806 |
| 4,771,854 | 9/1988 | Syrowik | 280/806 |
| 4,796,918 | 1/1989 | Meyer | 280/806 |
| 4,830,310 | 5/1989 | Higbee | 280/806 |
| 4,852,908 | 8/1989 | Nishimura | 280/802 |
| 4,856,728 | 8/1989 | Schmidt et al. | 280/806 |

FOREIGN PATENT DOCUMENTS

| 62-13751 | 1/1987 | Japan . | |
| 2202424 | 9/1988 | United Kingdom | 280/806 |

Primary Examiner—Richard A. Bertsch
Attorney, Agent, or Firm—Sixbey, Friedman, Leedom & Ferguson

[57] ABSTRACT

A webbing retractor for winding a webbing which is fastened around a seat occupant of a vehicle is arranged such that a claw member is engaged with a ratchet wheel fixed to a webbing take-up shaft and rotation of the take-up shaft in a direction in which the webbing is drawn out is thereby prevented when the speed of the vehicle suddenly reduces. Engagement of the claw member with the ratchet wheel is achieved by engaging a rotary wheel which is rotated in the same direction as that in which the take-up shaft is rotated with a driving plate which drives the claw member to cause it to be engaged with the ratchet wheel through a cam ring and an engaging lever. In consequence, the rotational force of the rotary wheel is reliably transmitted to the driving plate by means of the cam ring and the engaging lever.

18 Claims, 6 Drawing Sheets

WEBBING RETRACTOR

BACKGROUND OF THE INVENTION

1. Field of the Invention

The present invention relates to a webbing retractor with a locking mechanism which suspends rotation of a take-up shaft and thereby prevents a webbing from being drawn out.

2. Description of the Related Art

Various types of locking mechanisms for the webbing retractor are known. One example is disclosed in Japanese Utility Model Laid-Open No. 62-13751. In this webbing retractor, when an acceleration sensor is operated, a rotary wheel starts rotating in the direction in which a webbing is drawn out in synchronism with a take-up shaft. As the rotary wheel is rotated, a friction spring, which is wound around the outer peripheral surface of the rotary wheel in a compressed state by means of its own elasticity, rotates together with the rotary wheel, operating a claw member. As a result, the claw member is brought into engagement with a ratched wheel coaxially fixed to the take-up shaft, and rotation of the take-up shaft in the direction in which the webbing is drawn out is suspended. In this locking mechanism, the operation starting time of the claw member is precisely set relative to the pawls of the ratchet wheel in order to enable the operating claw member to be engaged with the ratchet wheel quickly and thereby ensure reliable prevention of the drawing-out of the webbing.

However, in this locking mechanism, since the claw member is operated due to a frictional force between the rotary wheel and the friction spring, the force with which the claw member is operated is not large, necessitating that various considerations be taken in order to operate the claw member smoothly.

Hence, the friction spring is wound around the rotary wheel in a clocking fashion so as to ensure reliable engagement between the friction spring and the rotary wheel while the locking mechanism is operating. Furthermore, relative movement between the friction spring and the rotary wheel is allowed during the abnormal operation, e.g., when the webbing is abnormally drawn out.

In this way, the force with which the claw member is operated is increased.

However, when the force with which the claw member is operated is increased, the friction between the friction spring and the rotary wheel increases, requiring that the webbing is abnormally drawn out with a large force. Thus, the friction which is generated during the normal operation is inconsistent with that which is generated during the abnormal operation.

SUMMARY OF THE INVENTION

In view of the aforementioned problem of the conventional technique, an object of the present invention is to provide a webbing retractor which allows a rotary wheel and a claw member to be held in engagement with each other during a normal operation so as to ensure reliable operation of the claw member and which is capable of releasing the engagement between the claw member and the rotary wheel for an abnormal operation.

To this end, the present invention provides a webbing retractor for winding a webbing of a vehicle which has: a ratchet wheel coaxially fixed to a take-up shaft around which the webbing is wound; a claw member which is pivotal between a first position at which the claw member engages the ratchet wheel and prevents rotation of the take-up shaft in a direction in which the webbing is drawn out and a second position at which the claw member is separated from the ratchet wheel and enables rotation of the take-up shaft; a sensing device operated when it detects sudden reduction in a speed of the vehicle; a rotary wheel which is coaxial with respect to the take-up shaft and which is rotatable relative to the take-up shaft, the rotary wheel being coupled t the take-up shaft and rotated in the direction in which the webbing is drawn out when the sensing device is operated; a driving plate which is rotatable relative to the rotary wheel, the driving plate causing the claw member to pivot from the second position to the first position when rotated in the direction in which the webbing is drawn out; an engaging lever supported on the driving plate, the engaging lever being pivotal between a third position at which the engaging lever couples the rotary wheel to the driving plate so as to rotate the driving plate in the direction in which the webbing is drawn out when the rotary wheel is rotated in the direction in which the webbing is drawn out and a fourth position at which it disconnects the rotary wheel from the driving plate; a cam member which can be displaced between a first state in which the cam member presses the engaging lever toward the third position and a second state in which the cam member presses the engaging lever toward the fourth position, the cam member being retained in the first state by a urging force; and an unlocking device for causing the claw member to pivot from the first position to the second position and for displacing the cam member from the first state to the second state.

In the present invention, when the vehicle is rendered to an emergency state, the sensing device detects a sudden reduction in the speed of the vehicle, and the webbing is drawn out by means of the force of inertia of the seat occupant, and the take-up shaft is thereby rotated in the direction in which the webbing is drawn out. The rotary wheel is coupled to the take-up shaft and starts rotating in the direction in which the webbing is drawn out. At that time, since the engaging lever is in a state in which it is pressed toward the third position by means of the cam member, the driving plate and the rotary wheel are in a coupled state, so rotation of the rotary wheel rotates the driving plate. Thus, the rotational force of the rotary wheel is reliably transmitted to the driving plate through the cam member and the engaging lever.

As the driving plate is rotated, the claw member pivots to the first position, and engages the ratchet wheel coaxially fixed to the webbing take-up shaft, thereby preventing rotation of the webbing take-up shaft in the direction in which the webbing is drawn out.

When operated, the unlocking device causes the claw member to pivot to the second position and thereby disengages it from the ratchet wheel while displacing the cam member to the second state. In consequence, the engaging lever is pivoted to the fourth position, and the coupling between the driving plate and the rotary wheel is thereby released. Thus, when the unlocking device is operated, the rotary wheel can be freely rotated relative to the driving plate. Furthermore, since the claw member is separated from the ratchet wheel, the webbing can be smoothly drawn out in an abnormal operation.

DESCRIPTION OF THE PREFERRED EMBODIMENT

Figure 2:
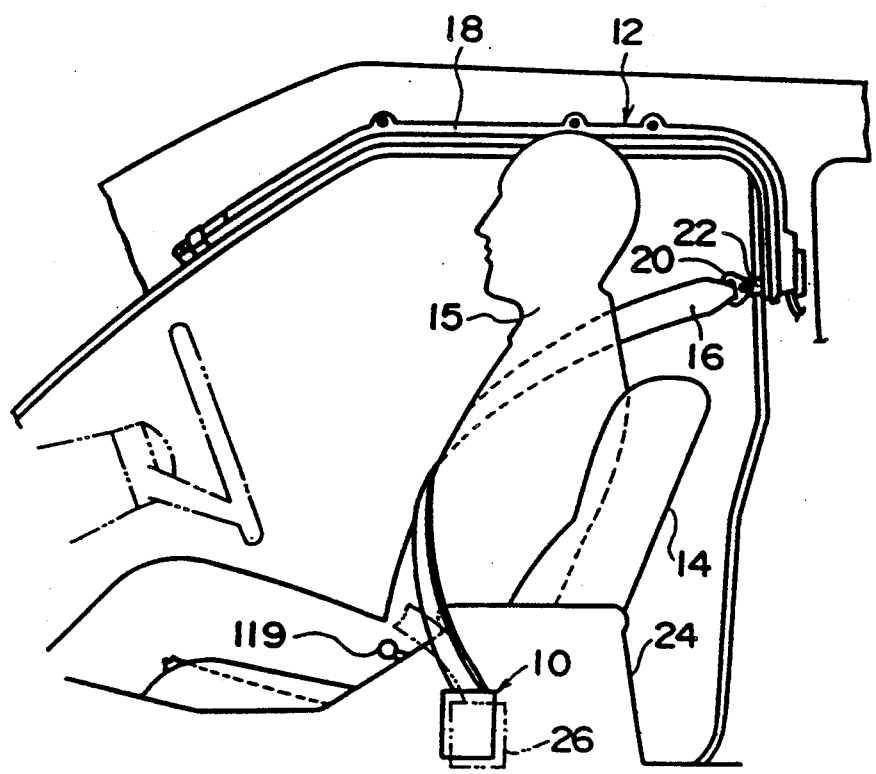
FIG. 2 is a front view showing how an automatic seat belt apparatus with the webbing retractor of FIG. 1 is installed in a vehicle.

FIG. 2 shows an automatic seat belt apparatus 12 with a webbing retractor 10 according to the present invention incorporated therein.

This automatic seat belt apparatus 12 is for a seat occupant who is seated at a driver's seat, and is capable of automatically fastening a webbing 16 around a seat occupant 15 who is seated at a seat 14 and of unfastening the webbing 16 from the seat occupant 15.

In the vicinity of a roof side of a vehicle is disposed a guide rail 18. The guide rail 18 supports an anchor plate 22, which is connected to one end portion of the webbing 16 through a coupling member 20, in such a manner as to be movable in the longitudinal direction of the guide rail 18. The anchor plate 22 is moved in the front and rear directions of the vehicle by a driving device which is not shown.

The other end of the webbing 16 is wound in the webbing retractor 10 fixed to a vehicle body within a center console 24 disposed at the central portion of a vehicle interior. In consequence, in a state where the anchor plate 22 is located at the end portion of the guide rail 18 which is on the rear side of the vehicle, the webbing 16 is in a state where it is fastened around the seat occupant 15 so as to secure the seat occupant 15 to his seat. In a state where the anchor plate 22 is located at the end portion of the guide rail 18 which is on the front side of the vehicle, space is generated between the webbing 16 and the seat 14, allowing the seat occupant 15 to easily get in and get out of the vehicle.

In the vicinity of the webbing retractor 10 is disposed a webbing retractor 26 (FIG. 5) for an automatic seat belt apparatus (not shown) for a seat occupant who is seated at a passenger's seat. The configuration of the webbing retractor 26 is basically the same as that of the webbing retractor 10.

Figure 1:
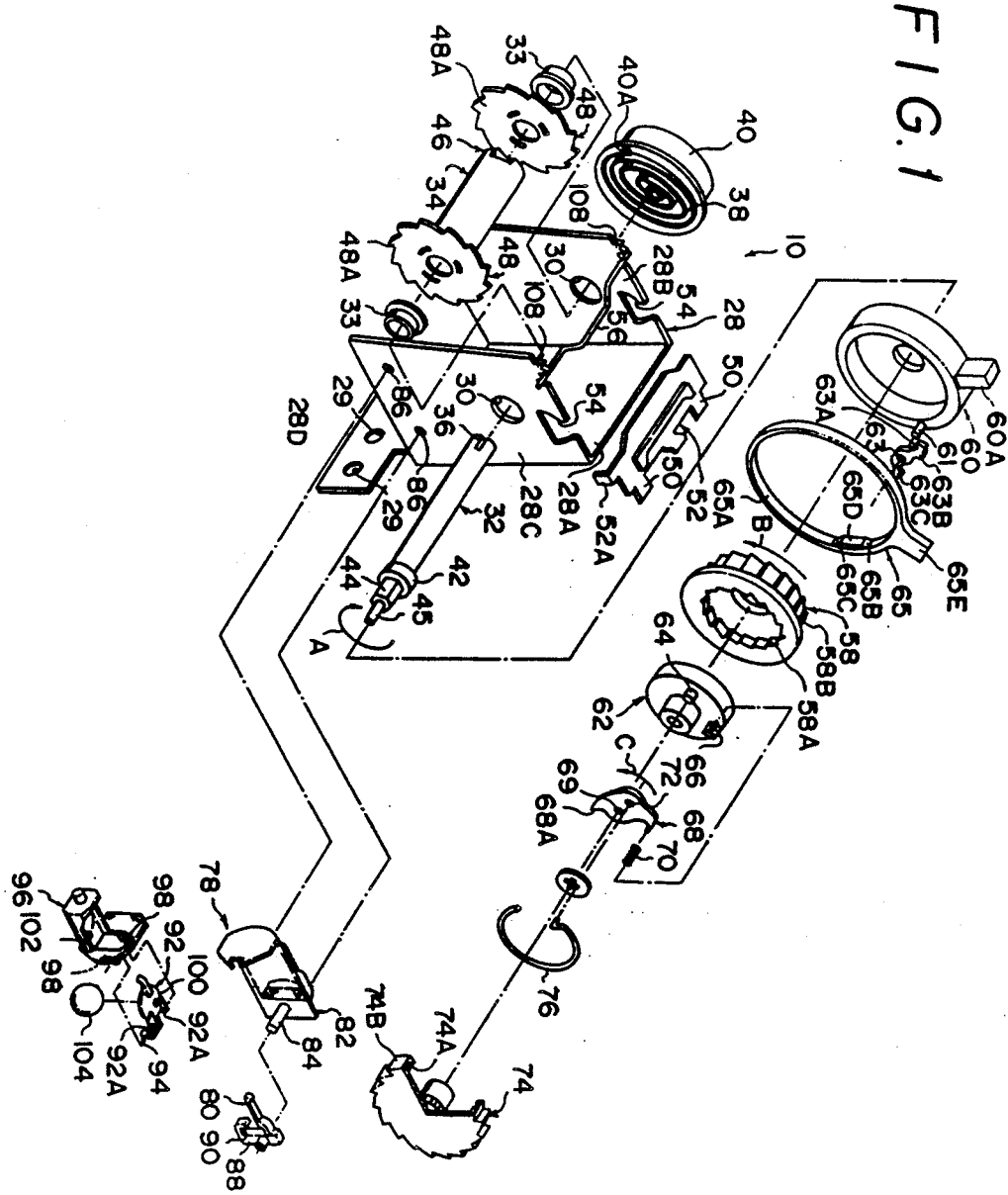
FIG. 1 is an exploded perspective view of an embodiment of a webbing retractor according to the present invention.

Turning to FIG. 1, the webbing retractor 10 has a frame 28 which is composed of a plate member on which various components are mounted. The frame 28 is comprised of a base portion 29A and leg portions 28B and 28C which extend from two end portions of the base portion 28A in a bent state parallel to each other.

A mounting bracket 28D having a substantially L-shaped form is integrally formed with the base portion 28A. The bracket 28D has a portion which extends downwardly form the lower end portion of the base portion 28A, and a portion which is bent and stretches toward the leg portion 28C.

The frame 28 is fixed to the vehicle body by means of a bolt (not shown) which is passed through a circular hole 29 formed in the mounting bracket 28D.

Both of the leg portions 28B and 28C have a circular through-hole 30 formed at positions where they oppose each other, into which a take-up shaft 32, around which the webbing 16 is wound, is rotatably inserted through bushings 33.

A cylindrical sleeve 34 is coaxially fixed to the outer peripheral surface of an intermediate portion of the take-up shaft 32. One end portion of the webbing 16 is fixed to this sleeve 34.

The take-up shaft 32 has a slit 36 at one end portion thereof which protrudes form the leg portion 28B, to which an inner end portion of a spiral spring 38 is interlocked. The spiral spring 38 is accommodated in a spring cover 40 mounted on the leg portion 28B. An outer end portion of the spiral spring 38 is interlocked with a notch 40A provided in the spring cover 40.

In consequence, the take-up shaft 32 is urged by the spiral spring 38 in a direction in which the webbing 16 is wound around the take-up shaft 32 (which is indicated by the arrow A in FIG. 1).

The sleeve 34 fixed to the take-up shaft 32 has convex portions 46 at the longitudinal two end portions thereof. Main gears 48, which are ratchet wheels, are coaxially fixed to the portions of the take-up shaft 32 located within the leg portions 28B and 28C in a state where they are fitted onto the convex portions 46 formed on the sleeve 34. In consequence, the main gears 48 is rotated together with the take-up shaft 32.

The upper end portions of the leg portions 28B and 28C as viewed in FIG. 1 have notches 54 having a substantially trapezoidal form at positions where they oppose each other, and a locking bar 52, which is a claw member, extends between these two notches 54. The locking bar 52 has locking claws at its forward end portion, which can engage with claws 48A formed on the main gears 48 when rotating of the take-up shaft 32 in the direction in which the webbing 16 is draw out (which is a direction opposite to that indicated by the arrow A in FIG. 1) is to be prevented.

The locking bar 52 is pivotal about an end portion thereof which is remote from the end portion at which the locking claws 50 are formed within a range defined by inner peripheral walls of the notches 54. Normally, the locking bar 52 is held in a state where the locking claws 50 are separated from the claws 48A formed on the main gear 48 by means of an urging force of a wire spring 56 fixed to the frame 28.

Figure 3:
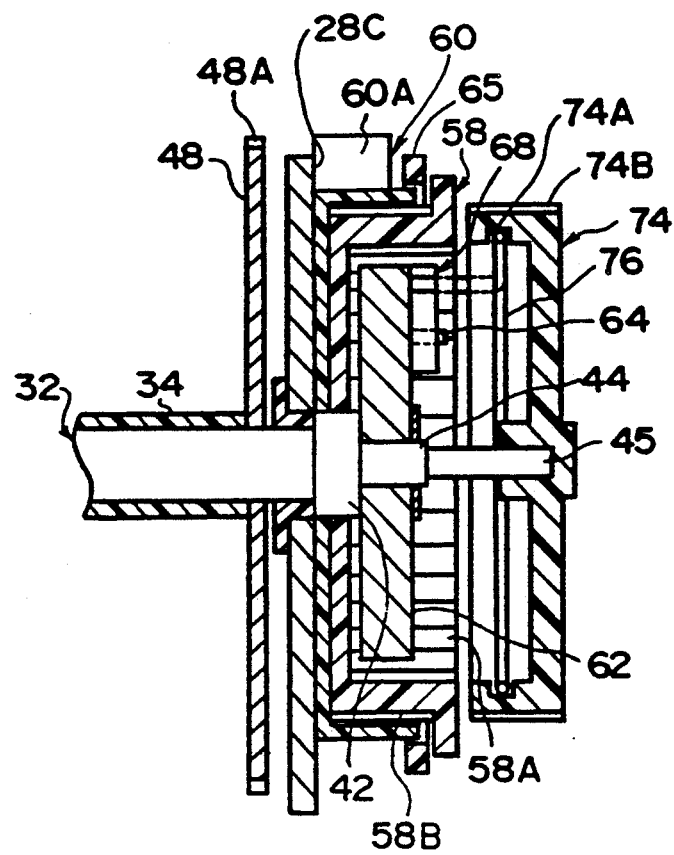
FIG. 3 is a cross-sectional view of essential parts of a locking mechanism.

As shown in FIGS. 1 and 3, the portion of the take-up shaft 32 which is located outside of the leg portion 28C forms a large-diameter portion 42, and the portion of the take-up shaft 32 which is outside of the large-diameter portion 42 forms a small-diameter portion 44 and a smaller-diameter portion 45.

An inner gear 58, which is a rotary wheel, is rotatably supported on the large-diameter portion 42. On the outer peripheral surface of the inner gear 48 and along the circumference thereof are formed teeth 58B. A ring-shaped driving plate 60 is disposed as if it is supported by the toothed outer peripheral surface of the inner gear 58. The driving plate 60 has a coupling portion 60A which protrudes outwardly in the radial direction of the driving plate 60. The coupling portion 60A is located at a position where it faces a tongue member 52A formed on the locking bar 52 so that it can press the tongue member 52A and thereby pivot the locking bar 52 against the urging force of the wire spring 56 so as to allow the locking claws 50 to be brought into engagement with the claws 48A of the main gear 48 as the driving plate 60 is rotated in the direction indicated by the arrow B in FIG. 1.

A pin 61 is mounted on the end surface of the driving plate 60 in such a manner that it runs in the axial direction of the take-up shaft 32, and an intermediate portion of an engaging lever 63 is rotatably supported on the pin 61. On one end of the engaging lever 63 is formed a claw 63A which faces the teeth 58B. At the back of the claw 63A is formed a convex portion 63B, which faces an inner peripheral surface 65A of a ring-shaped cam plate 65 which is an unlocking means. On the other end of the engaging lever 63 is formed a convex portion 63C, which also faces the inner peripheral surface 65A of the cam plate 65. The cam plate 65 can rotate coaxially with respect to the take-up shaft 32. The portion of the inner peripheral surface forms inclined portions 65B and 65C and a thick portion 65D which protrudes toward the central axis of the take-up shaft 32.

The engaging lever 63 is rotated and disposed such that either of the convex portions 63B and 63C can be disposed on the thick portion 65D of the cam plate 65. More specifically, in a normal sate, the cam plate 65 is held by the urging force of a tension spring 67 (FIG. 6) in a state where the convex portion 63B is in contact with the thick portion 65D and where the claw 63A is in engagement with the teeth 58B of the inner gear 58. As the cam plate 65 is rotated against the urging force of the tension spring 67 clockwise as viewed in FIG. 6 by the operation of a spool releasing lever, which will be described later, the engaging lever 63 is pivoted about the pin 61 clockwise as viewed in FIG. 6, and the convex portion 63C located at the other end portion of the engaging lever 63 is guided along the inclined portion 65C and brought into contact with the thick portion 65D. Concurrently with this, the convex portion 63B is guided along the inclined portion 65B and is brought into contact with the inner peripheral surface 65A. This separates the claw 63A form the teeth 58B.

The side of the inner gear 58 which is remote from the leg portion 28C is opened, and the inner peripheral surface of the open portion is toothed in the circumferential direction to form teeth 58A. The teeth 58A are set such that the teeth 58A and teeth 58B have a certain relation.

To the small-diameter portion 44 of the take-up shaft 32 which protrudes from the inner gear 58 is fixed a drive disk 62. The drive disk 62 is accommodated within the inner gear 58 in a state where the outer peripheral surface thereof is separate from the teeth 58A.

A pin 64 protrudes from the end surface of the drive disk 62 parallel to the axis of the take-up shaft 32, and a pawl 68 is rotatably supported on the pin 64 through a circular hole 69 formed in an intermediate portion of the pawl 68. On one end portion of the pawl 68 is formed a claw portion 68A which engages with the teeth 58A of the inner gear 58 when the pawl 68 is rotated about the pin 64. A compression coil spring 70 is interposed between the other end portion of the pawl 68 and a spring receiver 66 protruding from the drive disk 62 so as to urge the pawl 68 in a direction in which the claw portion 68A is separated from the teeth 58A (which is indicated by the arrow C in FIG. 1).

Also, the pawl 68 has a circular hole 72 in the vicinity of the circular hole 69, into which one end portion of a slip spring 76 is rotatably inserted. The slip spring 76 is mounted on a locking wheel 74 rotatably supported on the smaller-diameter portion 45 of the take-up shaft 32. More specifically, the side of the locking wheel 74 which opposes the leg portion 28C is opened, and the slit spring 76 is mounted in a groove 74A formed in the inner peripheral surface of the locking wheel 74 in a state where it is compressed by its own elasticity.

The outer peripheral surface of the locking wheel 74 is toothed to form teeth 74B, which face a sensor pawl 80 of an acceleration sensor 78.

The sensor pawl 80 is rotatably supported on a pin 84 mounted on a bracket 82. The bracket 82 has a pin (not shown) on the rear side thereof as viewed in FIG. 1, which is fitted into a circular hole 86 formed in the leg portion 28C, by which the bracket 82 is fixed to the leg portion 28C.

The sensor pawl 80 is made rotatable around the pin 84. The sensor pawl 80 engages the teeth 74B of the locking wheel 74 when it pivots clockwise from its horizontal state shown in FIG. 4.

The portion of the sensor pawl 80 extends in one direction in a J-shaped form as seen when locking in the axial direction of the take-up shaft 32 to form a hook 88. A recess 90 of the hook 88 accommodates a sphere 94 formed on one end of a lever 92.

On the lateral two end portions (in the axial direction of the take-up shaft 32) of the intermediate portion of the lever 92 are formed pins 92A, which are rotatably inserted into holes 98 formed in a ball casing 96.

The lever 92 also has an umbrella portion 100 on the side thereof which is remote form the sphere 94. The umbrella portion 100 is in contact with a ball 104 placed on an inclined surface 102 of the ball casing 96.

Figure 4:
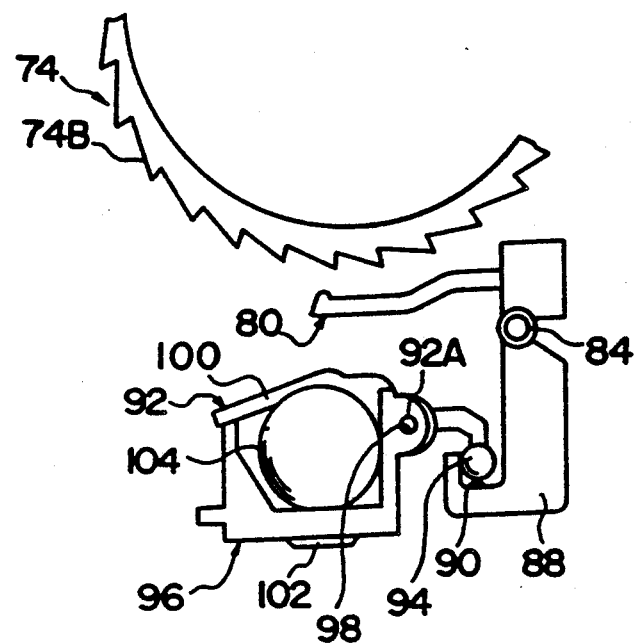
FIG. 4 is a front view of an acceleration sensor.

In consequence, when the acceleration of the vehicle reaches a predetermined value, the ball 104 climbs up the inclined surface 102, pushing up the umbrella portion 100 and thus rotating the lever 92 about the pins 92A clockwise as viewed in FIG. 4.

As a result, the sphere 94 causes the sensor pawl 80 to pivot, and brings it into engagement with the tooth 74B of the locking wheel 74. The locking wheel 74 whose rotation has been prevented by means of the sensor pawl 80 delays through the slip spring 76 rotation of the pawl 68 relative to the rotating of the take-up shaft 32 in the direction in which the webbing is drawn out, and thus rotates the pawl 68 about the pin 64 in the direction opposite to that indicated by the arrow C in FIG. 1. As the pawl 68 rotates in this manner, the claw portion 68A makes engagement with the tooth 58A of the inner gear 58. This makes the inner gear 58 rotate together with the drive disk 62.

Rotation of the inner gear 58 is transmitted to the driving plate 60 through the engaging lever 63, and the driving plate 60 is thereby rotated. At that time, the coupling member 60A presses the tongue member 52A of the locking bar 52, and thereby causes the locking bar 52 to pivot. As a result, the locking claws 50 of the locking bar 52 engage the claws 48A of the main gears 48, by means of which rotation of the main gears 48 is prevented.

Figure 5:
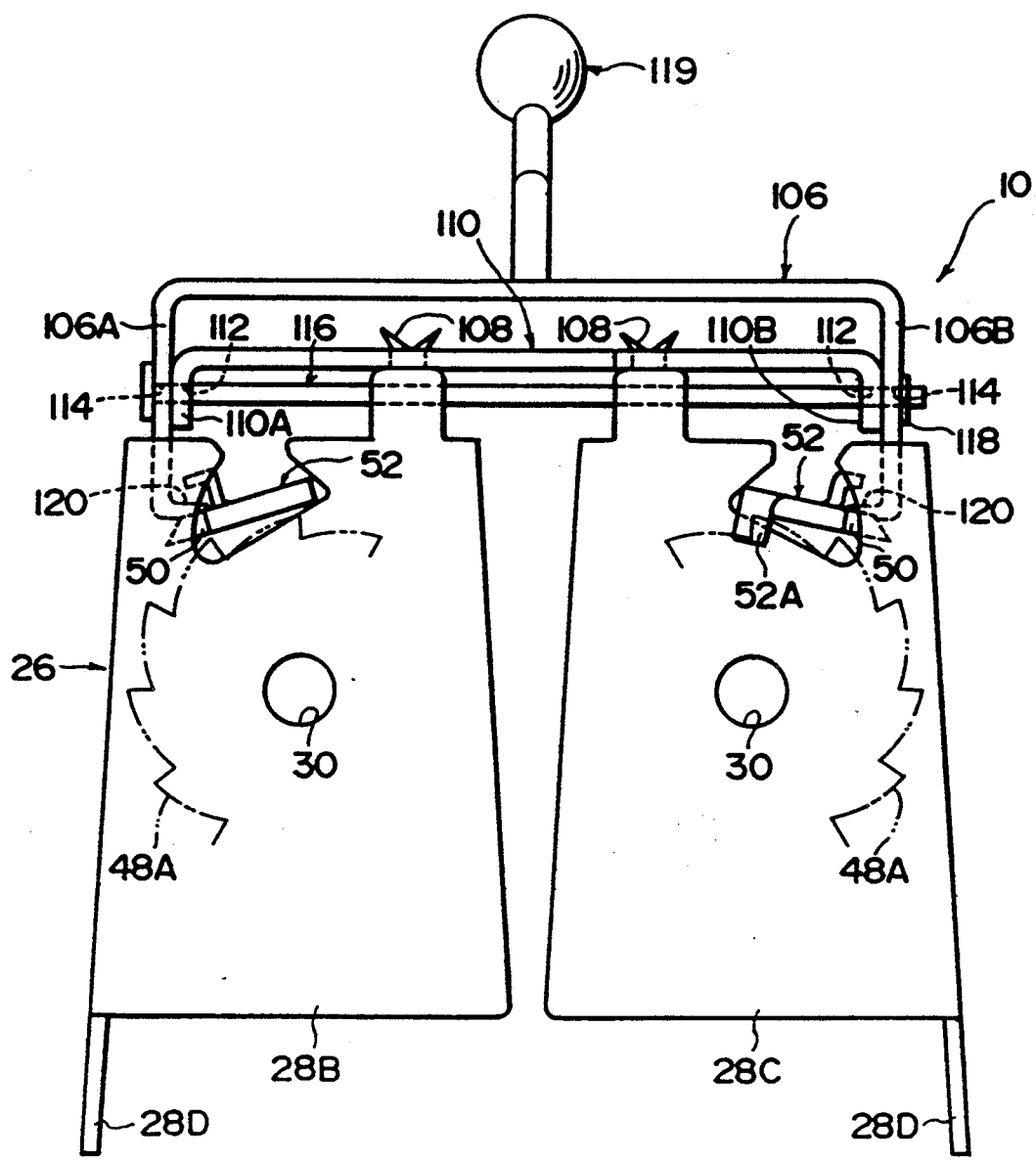
FIG. 5 is a front view showing how a spool releasing lever is mounted.

The webbing retractor 10 also includes a spool releasing lever 106 shown in FIG. 5 which forcibly separates the locking bar 52 which is preventing rotation of the main gears 48 form the main gears 48. Describing this spool releasing lever 106 in detail, webbing retractor 10 and 25 respectively incorporated in automatic seat belt apparatuses for seat occupants who are seated at a driver's seat and a passenger's seat are disposed in opposed relation. The upper end portions of the leg portions 28B and 28C of the webbing retractor 10 and 26 as viewed in FIG. 5 have engaging pawls 108, which are fitted into and caulked to the intermediate portion of a spool releasing bracket 110.

The two end portions of the spool releasing bracket 110 are bent downward as viewed in FIG. 5 to form leg portions 110A and 110B which extend parallel to each other. The leg portions 110A and 110B have a circular hole 112 at positions which face each other.

The spool releasing lever 106 is disposed as if it grips the leg portions 110A and 110B. The two end portions of the spool releasing lever 106 are also bent to form leg portions 106A and 106B which extend parallel to each other. The leg portions 106A and 106B have a circular hole 114 at positions which face each other.

A spool releasing shaft 116 is inserted into the circular holes 114 and 112. The shaft 116 is prevented from passing through the holes 114 and 112 by means of retaining rings 118.

In consequence, the spool releasing lever 106 is rotatable about the spool releasing shaft 116 by the operation of an operating portion 119 mounted on the upper end portion thereof.

On the forward end portions of the leg portions 106A and 106B of the spool releasing lever 106 are formed releasing pawls 120, which can be engaged with the intermediate portions of the locking bars 52.

Thus, as the spool releasing lever 106 is rotated about the spool releasing shaft 116 from the state shown in FIG. 5, the releasing pawl 120 displaces on an arcuate line and pulls up the locking bar 52.

Figure 6:
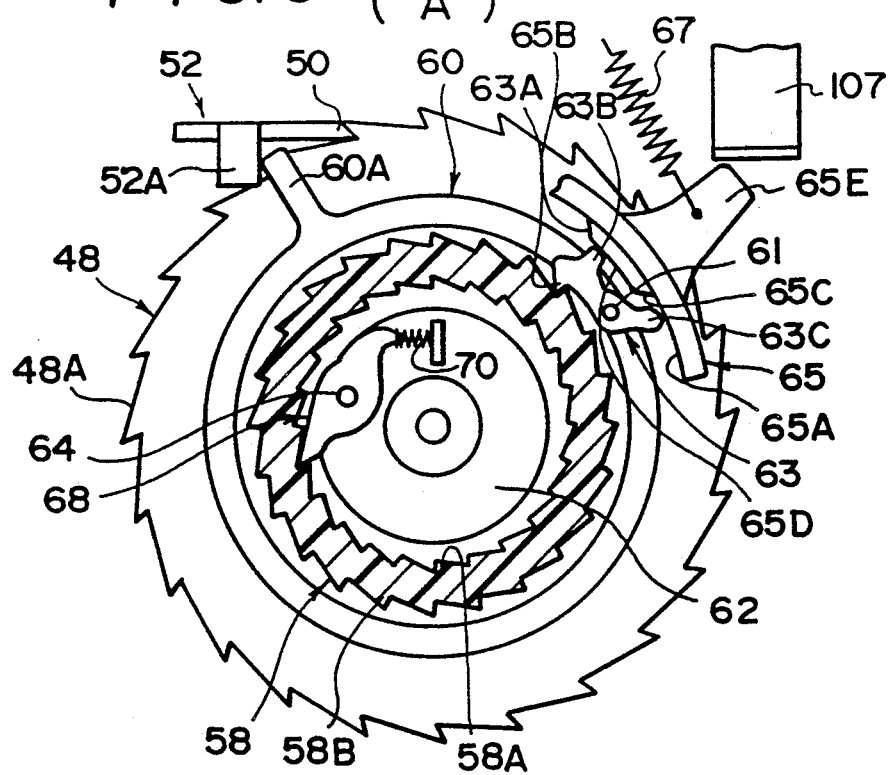
FIGS 6 (A) and (B) are side views showing the relation between a driving plate and a locking bar.
Figure 6:
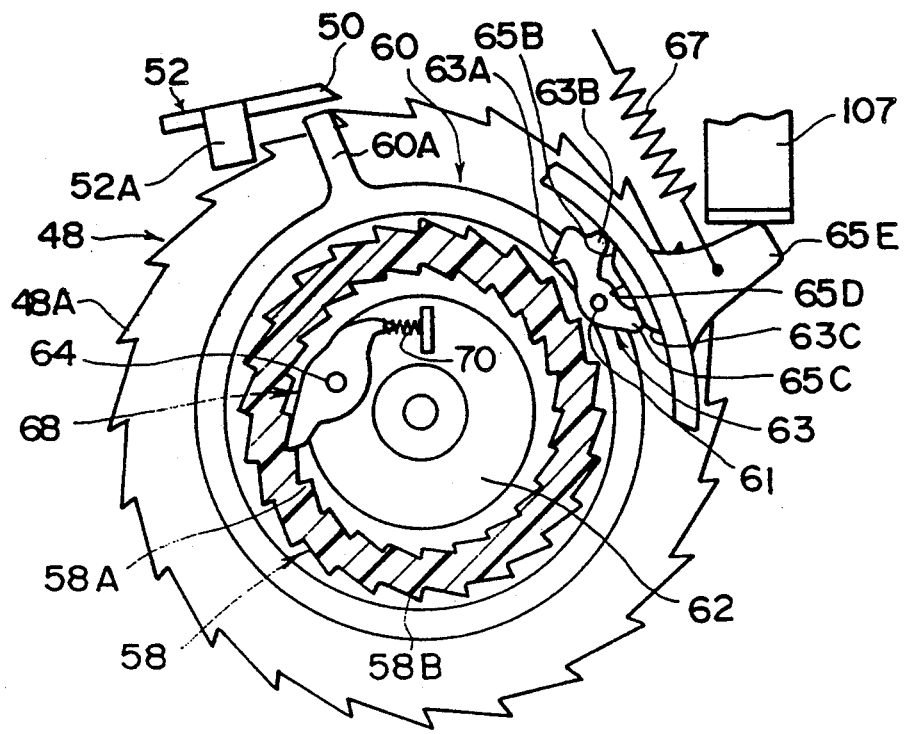

Furthermore, as shown in FIGS. 6 (A) and 6 (B), the spool releasing lever 106 has a movable lever 107 at a position where it faces a protrusion 65E of the cam plate 65 so that it can rotate the cam plate 65 clockwise as viewed in FIG. 6 against the urging force of the tension coil spring 67 concurrently with the pulling up operation of the locking bar 52.

Next, the operation of the webbing retractor 10 will be described.

When the seat occupant 15 gets in or gets out of the vehicle ,the anchor plate 22 is moved to and located at the front end portion of the guide rail 18 so as to generate space between the webbing 16 and the seat 14 through which the seat occupant can easily get in or get out of the vehicle.

Once the seat occupant 15 has seated at the seat 14, the anchor plate 22 is moved along the guide rail 18 toward the rear of the vehicle by means of the driving means so as to allow the webbing to be automatically fastened around the seat occupant 15.

In a normal state, since the webbing 16 is wound around the take-up shaft 32 of the webbing retractor 10 in a spiral fashion in a state where it can be freely drawn out, it follows the movement of the upper part of the body of the seat occupant 15 and does not restrict it.

When the vehicle is rendered to an emergency state, the ball 104 of the acceleration sensor 78 senses this, and climbs up the inclined surface 102, by means of which the umbrella portion 100 is pushed up and the lever 92 is thus rotated. As a result, the sphere 94 inclines the sensor pawl 80, and brings it into engagement with the tooth 74B of the locking wheel 74 which is rotating together with the take-up shaft 32.

Once rotation of the locking wheel 74 in the direction in which the webbing is drawn out is prevented as a consequence of this engagement, rotation of the slip spring 76 also stops, generating delay of rotation of the pawl 68 relative to the rotation of the take-up shaft 32 and rotating the pawl 68 about the pin 64 in the direction opposite to that indicated by the arrow C in FIG. 1.

In consequence, the claw portion 68A of the pawl 68 makes engagement with the teeth 58A of the inner gear 58, by means of which the rotational force of the drive disk 62 in the direction indicated by the arrow B in FIG. 1 is imparted to the inner gear 58.

As the inner gear 58 rotates, the driving lever 60 mounted on the outer periphery of the inner gear 58 also rotates through the engaging lever 63 (see FIG. 6(A)). As a result, the coupling portion 60A presses against the tongue member 52A of the locking bar 52, as shown in FIG. 6, and thereby causes the locking bar 52 to pivot. This brings the locking claws 50 into engagement with the claws 48A of the main gears 48. At the time, since the engaging lever 63 is held in engagement with the tooth 58B, the rotational force of the inner gear 58 can be reliably transmitted to the driving lever 60, and the force with which the locking bar 52 is pivoted can therefore be increased.

Thus, rotation of the take-up shaft 32 in the direction in which the webbing is drawn out (which is the direction opposite to that indicated by the arrow A in FIG. 1) is prevented, and the seat occupant 15 is therefore secured to the seat.

In a case where the main gears 48 are engaged firmly with the locking bar 52 due to the deformation of the locking bar 52 or the like, there is the possibility that the locking bar 52 cannot be separated from the main gears 48 by the urging force of the wire spring 56 after the emergency has been ended.

In that case, the spool releasing lever 106 is rotated to forcibly pivot the locking bar 52 and thereby separate it from the main gears 48.

In the above-described webbing winding device, when the spool releasing lever 106 is operated and the locking bar 52 is thereby separated from the main gears 48 in a state where the acceleration sensor 78 is preventing rotation of the locking wheel 74, the movable lever 107 presses against the cam plate 65 and rotates it clockwise as viewed in FIG. 6 (A) against the urging force of the tension coil spring 67. As the cam plate 65 is rotated clockwise as viewed in FIG. 6 (A), the convex portion 63C formed on the other end of the engaging lever 63 is guided along the inclined surface 65C and then climbs up the thick portion 65D. As a result, the engaging lever 63 is pivoted about the pin 61 clockwise as viewed in FIG. 6 (A), and the claw 63A of the engaging lever 63 is thereby separated form the teeth 58B (FIG. 6 (B)).

Drawing out of the webbing 16 in this state rotates the inner gear 58. However, the rotational force of the inner gear 58 is not transmitted to the driving lever 60, so the driving plate 60 remains stationary while the inner gear 58 is rotated relative to the driving lever 60.

Thus, in this embodiment, since the claw 63A is held in engagement with the tooth 58B in a normal operation ,as shown in FIG. 6 (A), the rotational force of the inner gear 58 can be reliably transmitted to the driving plate 60. However, when the spool releasing lever 106 is operated, the claw 63A is forcibly separated from the tooth 58B, as shown in FIG. 6 (B). In consequence, in a case where the webbing 16 is drawn out in a state where the acceleration sensor 78 is being operated, rotation of the inner gear 58 in the direction in which the webbing is drawn out is not transmitted to the driving plate 60, and the webbing 16 can thereby be drawn out smoothly.

More specifically, in this embodiment, the two types of opposed relations between the inner gear 58 and the driving plate 60 obtained during the normal operation and during the abnormal operation (rotation of the inner gear 58 together with the driving plate 60 and rotation of the inner gear 58 relative to the driving plate 60) can be implemented without using the frictional force.

In this invention, the webbing retractor is applied to the automatic seat belt apparatus. However, it is also applicable to the known 3 point seat belt apparatus. Furthermore, the present embodiment employs the acceleration sensor 78 which detects the acceleration of the vehicle by using the force of inertia of the sphere 94. However, other sensing means, such as a webbing sensitive inertia reel which operates in response to the sudden drawing out of the webbing 16, may also be employed.

As will be understood from the foregoing description, in the webbing retractor according to the present invention, the rotary wheel and the claw member are held in engagement in a normal operation so as to ensure reliably operation of the claw member. The claw member can be disengaged from the rotary wheel, if necessary.

What is claimed is:

1. A webbing retractor for winding a webbing of a vehicle, comprising:
   a ratchet wheel coaxially fixed to a take-up shaft around which said webbing is wound;
   a claw member which is pivotal between a first position at which said claw member engages said ratchet wheel and prevents rotation of said take-up shaft in a direction in which said webbing is drawn out and a second position at which said claw member is separated from said ratchet wheel and enables rotation of said take-up shaft;
   a sensing means operated when it detects sudden reduction in a speed of the vehicle;
   a rotary wheel which is coaxial with respect to said take-up shaft and which is rotatable relative to said take-up shaft, said rotary wheel being coupled to said take-up shaft and rotated in the direction in which said webbing is drawn out when said sensing means is operated;
   a driving plate which is rotatable relative to said rotary wheel, said driving plate causing said claw member to pivot from said second position to said first position when rotated in the direction in which said webbing is drawn out;
   an engaging lever supported on siad driving plate, said engaging lever being pivotal between a third position at which said engaging lever couples said rotary wheel to said driving plate so as to rotate said driving plate in the direction in which said webbing is drawn out when said rotary wheel is rotated in the direction in which said webbing is drawn out and a fourth position at which it disconnects said rotary wheel from said driving plate;
   a cam means which can be displaced between a first state in which said cam means presses said engaging lever toward said third position and a second state in which said cam means presses said engaging lever toward said fourth position, said cam means being retained in said first state by a urging force; and
   an unlocking means for causing said claw member to pivot from said first position to said second position and for displacing said cam means form said first state to said second state.

2. A webbing retractor according to claim 1, wherein an outer periphery of said rotary wheel has an annular toothed portion, and wherein the coupling between said rotary wheel and said driving plate is achieved by an engagement of said engaging lever with said toothed portion.

3. A webbing retractor according to claim 2, wherein said cam means includes an annular member which is coaxial with respect to said take-up shaft, said annular member having a protrusion on its inner peripheral surface, the pressing of said engaging lever being performed by means of said protrusion.

4. A webbing retractor according to claim 3, wherein said displacement of said cam means is performed by pivot of said cam means about said take-up shaft.

5. A webbing retractor according to claim 4, wherein said engaging lever has a first convex portion which is brought into contact with said protrusion and is pressed toward said third position, and a second convex position which is brought into contact with said protrusion and pressed toward said fourth position.

6. A webbing retractor according to claim 5, wherein said driving plate has a pressing portion which presses against said claw member and thereby causes it to pivot from said second position to said first position.

7. A webbing retractor according to claim 6, wherein said unlocking means performs the pivot of said claw member and the displacement of said cam means when it is pivoted.

8. A webbing retractor according to claim 7, further comprising an urging means for maintaining said claw member at said second position.

9. A webbing retractor according to claim 7, wherein said unlocking means has a first portion which presses against part of said claw member and thereby performs the pivot of said claw member when said unlocking mean is pivoted, and a second portion which presses against part of said annular member and thereby performs the displacement of said annular member when said unlocking mean is pivoted.

10. A webbing retractor according to claim 7, wherein said part of said annular member is protrusion provided on an outer periphery thereof.

11. A webbing retractor for winding a webbing which is fastened around a seat occupant of a vehicle, comprising:
   a take-up shaft around which said webbing is wound by an urging force;
   a ratchet wheel which is coaxial with respect to said take-up shaft and which is rotated together with said take-up shaft;
   a claw member which is pivotal between a first position at which said claw member engages said ratchet wheel and prevents rotation of said take-up shaft in a direction in which said webbing is drawn out and a second position at which said claw member is separated from said ratchet wheel and enables rotation of said take-up shaft;
   a first urging means for urging said claw member to said second position;
   a sensing means operated when it detects sudden reduction in a speed of the vehicle;
   a rotary wheel which is coaxial with respect to said take-up shaft and which is rotatable relative to said take-up shaft, said rotary wheel being coupled to said take-up shaft an rotated in the direction in which said webbing is drawn out when said sensing means is operated;

a driving plate which is rotatable relative to said rotary wheel, said driving plate causing said claw member to pivot from said second position to said first position when rotated in the direction in which said webbing is drawn out;

an engaging lever supported on said driving plate, said engaging lever being pivotal between a third position at which said engaging lever couples said rotary wheel to said driving plate so as to rotate said driving plate in the direction in which said webbing is drawn out when said rotary wheel is rotated in the direction in which said webbing is drawn out and a fourth position at which it disconnects said rotary wheel from said driving plate;

a cam ring which is coaxial with respect to said take-up shaft and which is pivotal between a first state in which said cam ring presses said engaging lever toward said third position and a second state in which said cam ring presses said engaging lever toward said fourth position;

a second urging means for urging said cam ring in a direction in which said cam ring is maintained in said first state; and an unlocking means for causing said claw member to pivot from said first position to said second position and for displacing said cam ring from said first state to said second state.

12. A webbing retractor according to claim 11, wherein an outer periphery of said rotary wheel has an annular toothed portion, and wherein the coupling between said rotary wheel and said driving plate is achieved by an engagement of said engaging lever with said toothed portion.

13. A webbing retractor according to claim 12, wherein said cam ring has a protrusion on an inner peripheral surface thereof, the pressing of said engaging lever being performed by means of said protrusion.

14. A webbing retractor according to claim 13, wherein said engaging lever has a first convex portion which is brought into contact with said protrusion and is pressed toward said third position, and a second convex position which is brought into contact with said protrusion and pressed toward said fourth position.

15. A webbing retractor according to claim 14, wherein said driving plate has a pressing portion which presses said claw member against an urging force of said first urging means and thereby causes it to pivot from said second position to said first position.

16. A webbing retractor according to claim 15, wherein said unlocking means performs the pivot of said claw member against the urging force of said first urging means and the displacement of said cam ring against the urging force of said second urging means when it is pivoted in one direction.

17. A webbing retractor according to claim 16, wherein said unlocking means has a first portion which presses against part of said claw member and thereby performs the pivot of said claw member when said unlocking means is pivoted in said one direction, and a second portion which presses against part of said cam ring and thereby performs the pivot of said cam ring when said unlocking means is pivoted in said one direction.

18. A webbing retractor according to claim 17, wherein said part of said cam ring is protrusion provided on an outer periphery thereof.

* * * * *